(12) United States Patent
Herrington et al.

(10) Patent No.: US 11,787,925 B2
(45) Date of Patent: Oct. 17, 2023

(54) COMPOSITION COMPRISING POLYPROPYLENE FOR INJECTION STRETCH BLOW MOLDING, METHODS OF MAKING AND USING THE SAME

(71) Applicant: Braskem America, Inc., Philadelphia, PA (US)

(72) Inventors: Kevin Herrington, Pittsburgh, PA (US); Kimberly Miller McLoughlin, Pittsburgh, PA (US)

(73) Assignee: BRASKEM AMERICA, INC., Philadelphia, PA (US)

( * ) Notice: Subject to any disclaimer, the term of this patent is extended or adjusted under 35 U.S.C. 154(b) by 442 days.

(21) Appl. No.: 16/690,511

(22) Filed: Nov. 21, 2019

(65) Prior Publication Data
US 2020/0165428 A1  May 28, 2020

Related U.S. Application Data

(60) Provisional application No. 62/771,493, filed on Nov. 26, 2018.

(51) Int. Cl.
| | | |
|---|---|---|
| *C08F 10/06* | (2006.01) | |
| *C08F 210/06* | (2006.01) | |
| *C08L 23/10* | (2006.01) | |
| *C08L 23/12* | (2006.01) | |
| *C08L 23/14* | (2006.01) | |
| *B29C 49/06* | (2006.01) | |
| *C08L 23/16* | (2006.01) | |
| *C08L 23/18* | (2006.01) | |
| *C08L 51/06* | (2006.01) | |
| *C08L 33/08* | (2006.01) | |
| *C08L 81/06* | (2006.01) | |
| *C08K 5/14* | (2006.01) | |
| *C08L 83/04* | (2006.01) | |
| *B29C 45/00* | (2006.01) | |

(52) U.S. Cl.
CPC ............... *C08L 23/14* (2013.01); *C08K 5/14* (2013.01); *C08L 23/16* (2013.01); *C08L 23/18* (2013.01); *C08L 33/08* (2013.01); *C08L 51/06* (2013.01); *C08L 81/06* (2013.01); *C08L 83/04* (2013.01); *B29C 45/0001* (2013.01); *B29C 49/06* (2013.01); *C08L 2205/02* (2013.01); *C08L 2312/06* (2013.01)

(58) Field of Classification Search
CPC ........ C08L 23/14; C08L 23/142; C08L 23/16; C08L 23/18; C08L 51/06; C08L 81/06; C08F 10/06; C08F 110/06; C08F 210/06; C08J 3/24

See application file for complete search history.

(56) References Cited

U.S. PATENT DOCUMENTS

| | | | |
|---|---|---|---|
| 8,871,868 B2 | 10/2014 | Dias et al. | |
| 2002/0151611 A1 | 10/2002 | Thoen et al. | |
| 2004/0110910 A1* | 6/2004 | Arjunan ............... | C08F 110/06 526/127 |
| 2009/0057961 A1 | 3/2009 | McKeeman et al. | |
| 2018/0022906 A1 | 1/2018 | Carnevale et al. | |

FOREIGN PATENT DOCUMENTS

| | | |
|---|---|---|
| WO | WO03082971 A2 * | 10/2003 |
| WO | WO2007100504 A2 * | 9/2007 |
| WO | WO2008092627 A1 * | 8/2008 |

OTHER PUBLICATIONS

Injection stretch blow molding process https://www.rydtooling.com/injection-stretch-blow-molding-process/ (Year: 2023).*
Injection stretch blow molding https://www.bpf.co.uk/plastipedia/processes/Injection_Stretch_Blow_Moulding.aspx (Year: 2023).*
International Search Authority/US; International Search Report & Written Opinion dated Jan. 29, 2020 (34 pages).

* cited by examiner

*Primary Examiner* — Irina S Zemel
*Assistant Examiner* — Jeffrey S Lenihan
(74) *Attorney, Agent, or Firm* — Duane Morris LLP

(57) ABSTRACT

A composition comprising polypropylene having a high melt strength suitable for an injection stretch blow molding (ISBM) process is provided. Such a composition includes a polypropylene (PP) copolymer having a branched structure. The PP copolymer is a random copolymer derived from propylene and at least one comonomer selected from ethylene, any $C_4$-$C_8$ alpha-olefin, or any combinations thereof. The composition has a melt flow index in a range of from 8 g/10 minutes to 30 g/10 minutes. A resulting fabricated article, a method of making the composition, and a method of using the composition are also provided.

19 Claims, 2 Drawing Sheets

COMPOSITION COMPRISING POLYPROPYLENE FOR INJECTION STRETCH BLOW MOLDING, METHODS OF MAKING AND USING THE SAME

RELATED APPLICATIONS

This application claims the benefit of U.S. Provisional Application No. 62/771,493, filed Nov. 26, 2018, which application is expressly incorporated by reference herein in its entirety.

FIELD OF THE INVENTION

The disclosure relates to polymers generally. More particularly, the disclosed subject matter relates to a composition comprising polypropylene, the method of making the same, the method of using the same including a process of injection stretch blow molding, and resulting products such as bottles.

BACKGROUND OF THE INVENTION

Semi-crystalline polyolefins such as polypropylene (PP) have gained wide commercial acceptance and usage in numerous applications because of the relatively low cost of the polymers and the desirable properties they exhibit. These properties include good impact resistance, good heat stability and high chemical resistance.

Polypropylene (PP) provides a balance of stiffness, chemical resistance, optical properties, and heat resistance that are desirable in a wide range of applications, including food packaging. PP has a favorable environmental footprint, in part because it is readily recyclable. However, it lacks the needed melt strength to perform well in injection stretch blow molding (ISBM). The market related to ISBM is currently dominated by polyethylene terephthalate (PET) and high density polyethylene (HDPE).

In addition, polypropylene polymers, particularly propylene homopolymers, have a disadvantage of being brittle with low impact resistance, especially at low temperatures. To address these issues, manufacturers have incorporated another material rubber, which forms a dispersed phase within the polypropylene matrix. These two-phase materials are referred to as impact copolymers or ICPs.

SUMMARY OF THE INVENTION

The present invention provides a composition comprising polypropylene (PP), a resulting fabricated article such as a bottle, the methods of making such a composition and the resulting article, and the methods of using the same.

In accordance with some embodiments, a composition comprising a polypropylene (PP) copolymer having a branched structure is provided. The PP copolymer is a random copolymer derived from propylene and at least one comonomer selected from the group consisting of ethylene, any $C_4$-$C_8$ alpha-olefin, and combinations thereof. The composition has a melt flow index in a range of from 5 g/10 minutes to 30 g/10 minutes according to and measured per ASTM D1238 using a load of 2.16 kg at 230° C. The composition comprising polypropylene has a high melt strength suitable for an injection stretch blow molding (ISBM) process.

In some embodiments, the at least one comonomer or moiety thereof has a molar content in a range from about 1% to about 10% by a total amount of propylene and the at least one comonomer. The at least one comonomer may comprise or is ethylene in some embodiments.

The composition may have a melt flow index in a range of from 5 g/10 minutes to 25 g/10 minutes in some embodiments. The composition has a crystallization temperature of less than 130° C. (e.g., 100-130° C.), and a melting temperature in a range of from about 140° C. to 180° C.

In some embodiments, the composition is made by mixing, for example, extruding, the random copolymer of propylene and at least one comonomer with a poly(sulfonyl azide) at an elevated temperature. The poly(sulfonyl azide) has a content in the range from 500 ppm to 5,000 ppm, based on the total weight of the random copolymer and the poly(sulfonyl azide).

In some other embodiments, the composition is made by branching or crosslinking the random copolymer of propylene using a peroxide, an acrylate, a siloxane, a second polymer having vinyl functional groups, or e-beam.

The propylene-containing composition provided in the present disclosure has a haze value less than 30%. The haze value is measured using at an injection molded plaque having a thickness of 0.508 millimeter (20 mil) following ASTM D1003.

The present disclosure also provides a fabricated article comprising the composition as described above. The article such as a bottle may be made by an injection stretch blow molding (ISBM) process using the composition. The descriptions above regarding the composition also apply to the article. For example, in some embodiments, the random copolymer is derived from propylene and ethylene, and ethylene has a molar content in a range of from about 1% to about 10%. In some embodiments, the article is a bottle having a clear wall having a haze value less than 30%.

In another aspect, the present disclosure also provides a method of preparing the composition. Such a method comprises a step of branching or crosslinking the random copolymer of propylene to form the PP copolymer having a branched structure. In some embodiments, the step of branching or crosslinking comprises a step of mixing the random copolymer of propylene and at least one comonomer with a poly(sulfonyl azide) at an elevated temperature. Such a mixing may be performed through extrusion in a single-screw or twin-screw extruder. In some other embodiments, the step of branching or crosslinking the random copolymer of propylene is performed using a peroxide, an acrylate, a siloxane, a second polymer having vinyl functional groups, or e-beam.

In another aspect, the present disclosure also provides a method of using the composition, comprising a step of injection stretch blow molding (ISBM) the composition so as to fabricate an article. The descriptions above regarding the composition also apply to the article. For example, in some embodiments, the composition has a crystallization temperature in a range of from 100° C. to 130° C., a melting temperature in a range of from about 140° C. to 180° C., and a melt flow index in a range of from 5 to 25 g/10 minutes. In some embodiments, the method of using the composition comprising a step of molding the composition into a preform of the article before the step of injection stretch blow molding.

The composition and the fabricated article provided in this invention exhibit unexpected properties including, but not limited to, a good combination of a balance of good mechanical properties, high chemical resistance, high optical clarity, and high temperature resistance. For the first time, the present disclosure provides a polypropylene composition performing very well in an injection stretch blow molding (ISBM) process, while providing excellent optical clarity of a resulting molded article.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion. Like reference numerals denote like features throughout specification and drawings.

DETAILED DESCRIPTION OF THE INVENTION

Figure 1:
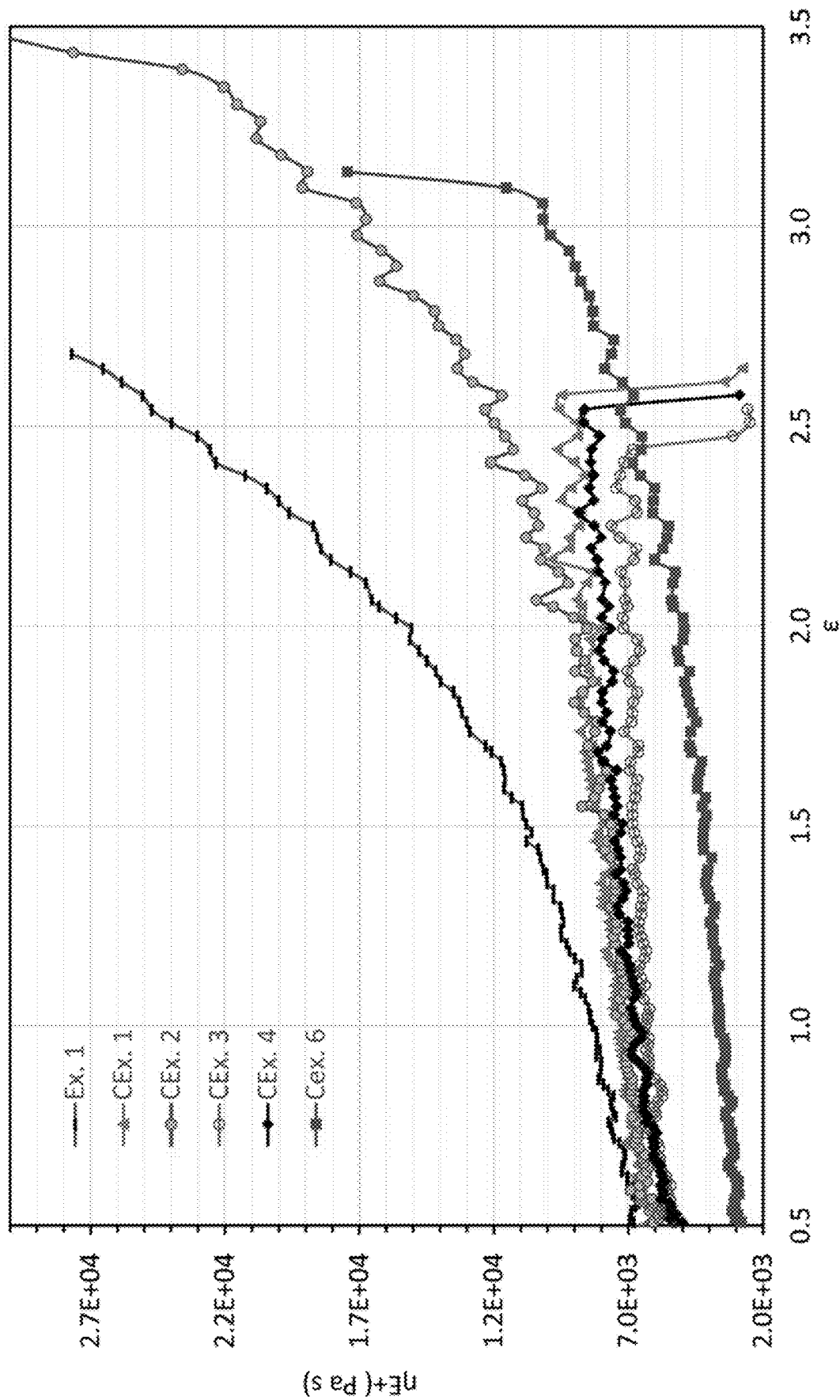
FIG. 1 shows relationship between the extensional viscosity (Pa·s, in y-axis) and Hencky strain (in x-axis) for some experimental samples and comparative samples.

This description of the exemplary embodiments is intended to be read in connection with the accompanying drawings, which are to be considered part of the entire written description. In the description, relative terms such as "lower," "upper," "horizontal," "vertical,", "above," "below," "up," "down," "top" and "bottom" as well as derivatives thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected," refer to a relationship wherein structures are secured or attached to one another either directly or indirectly through intervening structures, as well as both movable or rigid attachments or relationships, unless expressly described otherwise.

When values are expressed as approximations, by use of the antecedent "about," it will be understood that the particular value forms another embodiment. As used herein, "about X" (where X is a numerical value) preferably refers to ±10% of the recited value, inclusive. For example, the phrase "about 8" preferably refers to a value of 7.2 to 8.8, inclusive; as another example, the phrase "about 8%" preferably (but not always) refers to a value of 7.2% to 8.8%, inclusive. Where present, all ranges are inclusive and combinable. For example, when a range of "1 to 5" is recited, the recited range should be construed as including ranges "1 to 4", "1 to 3", "1-2", "1-2 & 4-5", "1-3 & 5", "2-5", and the like. In addition, when a list of alternatives is positively provided, such listing can be interpreted to mean that any of the alternatives may be excluded, e.g., by a negative limitation in the claims. For example, when a range of "1 to 5" is recited, the recited range may be construed as including situations whereby any of 1, 2, 3, 4, or 5 are negatively excluded; thus, a recitation of "1 to 5" may be construed as "1 and 3-5, but not 2", or simply "wherein 2 is not included." It is intended that any component, element, attribute, or step that is positively recited herein may be explicitly excluded in the claims, whether such components, elements, attributes, or steps are listed as alternatives or whether they are recited in isolation.

For purposes of the description hereinafter, it is to be understood that the embodiments described below may assume alternative variations and embodiments. It is also to be understood that the specific articles, compositions, and/or processes described herein are exemplary and should not be considered as limiting.

The term "polymer," as used herein, refers to a polymeric compound prepared by polymerizing monomers, whether of the same or a different type. The generic term polymer thus embraces the term "homopolymer," usually employed to refer to polymers prepared from only one type of monomer, as well as "copolymer" which refers to polymers prepared from two or more different monomers.

"Polypropylene" shall mean polymers consisting of propylene monomer, such as polypropylene homopolymer. "Polypropylene-based resin" or "polypropylene-based polymer" and "polypropylene" are used synonymously. These terms shall mean polymers containing at least 50% by weight, based on the weight of the polymer, of propylene units.

Melt strength of polypropylene (PP) may not be high enough for a process of injection stretch blow molding (ISBM). Polyethylene terephthalate (PET) and high density polyethylene (HDPE) are generally used for ISBM processes. PP provides greater clarity than HDPE, and provides better heat resistance than PET, enabling hot fill processing and other commonly used sterilization methods for food packaging. There is a need for developing polypropylene compositions having good optical clarity, and high melt strength suitable for ISBM processes, in addition to its high heat resistance.

In some embodiments, a branched PP homopolymer can improve injection stretch blow molding (ISBM) processing window; however, doing so creates a hazy part decreasing one of the major advantages, i.e., optical clarity, which PP has over HDPE.

The present disclosure provides a composition comprising polypropylene (PP) copolymer and having a branched structure, which has desired melt strength for ISBM processes. The present disclosure also provide the methods of making and the method of using such a composition, and a fabricated article such as a bottle comprising such a composition. The article also provides excellent optical clarity.

The present invention provides a composition comprising polypropylene (PP), a resulting fabricated article such as a bottle, the methods of making such a composition and the resulting article, and the methods of using the same.

In accordance with some embodiments, the polypropylene (PP) copolymer has a branched structure. The PP copolymer is a random copolymer derived from propylene and at least one comonomer selected from the group consisting of ethylene, any $C_4$-$C_8$ alpha-olefin, and combinations thereof. The composition has a melt flow index in a range of from 8 g/10 minutes to 30 g/10 minutes according to and measured per ASTM D1238 using a load of 2.16 kg at 230° C. The composition comprising polypropylene has a high melt strength suitable for an injection stretch blow molding (ISBM) process.

The alpha-olefin comonomer can be linear or branched. A combination of two or more comonomers can be also used. Examples of suitable comonomers include ethylene, linear $C_4$-$C_8$ alpha-olefins, and alpha-olefins having one or more $C_1$-$C_3$ alkyl branches. Specific examples may include, but are not limited to, ethylene; 3-methyl-1-butene; 3,3-dimethyl-1-butene; 1-pentene; 1-pentene with one or more methyl, ethyl or propyl substituents; 1-hexene with one or two methyl, ethyl substituents; 1-heptene with one methyl substituent; and 1-octene. Preferred comonomers include ethylene, 1-butene, 1-pentene, 3-methyl-1-butene, 1-hexene, 3-methyl-1-pentene, 4-methyl-1-pentene, 3,3-dimethyl-1-butene, 1-heptene, 1-hexene, 1-pentene, 1-octene, 1-pentene with a methyl substituent on any of $C_3$ or $C_4$, 1-hexene with two methyl substituents in any stoichiometrically acceptable combination on $C_3$-$C_5$. In some embodiments, the comonomer is ethylene.

In some embodiments, the at least one comonomer or moiety thereof has a molar content in a range from about 1% to about 10% by a total amount of propylene and the at least one comonomer. The at least one comonomer may comprise or is ethylene in some embodiments.

The composition may have a melt flow index in a range of from 5 g/10 minutes to 25 g/10 minutes in some embodiments. The composition has a crystallization temperature of less than 130° C. (e.g., 100-130° C.), and a melting temperature in a range of from about 140° C. to 180° C.

In some embodiments, the composition is made by mixing the random copolymer of propylene and at least one comonomer with a poly(sulfonyl azide) at an elevated temperature. The poly(sulfonyl azide) has a content in the range from 500 ppm to 5,000 ppm, based on the total weight of the random copolymer and the poly(sulfonyl azide).

For brevity, unless expressly indicated otherwise, references to "sulfonyl azide," or "poly(sulfonyl azide)" made in the present disclosure will be understood to encompass a compound having multiple function group of sulfonyl azide groups (—$SO_2N_3$). The poly(sulfonyl azide) is any compound having at least two sulfonyl azide groups (—$SO_2N_3$) reactive with the propylene polymer. Preferably the poly (sulfonyl azide)s have a structure X—R—X wherein each X is $SO_2N_3$ and R represents an unsubstituted or inertly substituted hydrocarbyl, hydrocarbyl ether or silicon-containing group, preferably having sufficient carbon, oxygen or silicon, preferably carbon, atoms to separate the sulfonyl azide groups sufficiently to permit a facile reaction between the propylene polymer and the sulfonyl azide, more preferably at least 1, more preferably at least 2, most preferably at least 3 carbon, oxygen or silicon, preferably carbon, atoms between functional groups. While there is no critical limit to the length of R, each R advantageously has at least one carbon or silicon atom between X's and preferably has less than about 50, more preferably less than about 20, most preferably less than about 15 carbon, oxygen or silicon atoms. Silicon containing groups include silanes and siloxanes, preferably siloxanes.

Examples of a suitable poly(sulfonyl)azides include but are not limited to 1, 5-pentane bis(sulfonylazide), 1,8-octane bis(sulfonyl azide), 1,10-decane bis(sulfonyl azide), 1,10-octadecane bis(sulfonyl azide), 1-octyl-2,4,6-benzene tris (sulfonyl azide), 4,4'-diphenyl ether bis(sulfonyl azide), 1,6-bis(4'-sulfonazidophenyl)hexane, 2,7-naphthalene bis (sulfonyl azide), and mixed sulfonyl azides of chlorinated aliphatic hydrocarbons containing an average of from 1 to 8 chlorine atoms and from about 2 to 5 sulfonyl azide groups per molecule, and mixtures thereof. Preferred poly(sulfonyl azide)s include oxy-bis(4-sulfonylazidobenzene), 2,7-naphthalene bis(sulfonyl azido), 4,4'-bis(sulfonyl azido)biphenyl, 4,4'-diphenyl ether bis(sulfonyl azide) and bis(4-sulfonyl azidophenyl)methane, a mixture or any combination thereof. In some embodiments, 4,4'-diphenyl oxide bis(sulfonyl azide) (DPOBSA) or a molecular blend containing DPOBSA is used.

In some embodiments, the content of the poly(sulfonyl azide) is in the range from 500 ppm to 5,000 ppm (such as from 2,000 ppm to 4,000 ppm), based on the total weight of the composition. The poly(sulfonyl azide) can be added in the form of a molecular melt with other ingredients such as an antioxidant.

The propylene polymer and poly(sulfonyl azide) are physically mixed. Such physical mixing can occur in any equipment, such as V-blenders, ribbon or paddle blenders, tumbling drums, or extruders, which mix the coupling agent and the propylene polymer. The term extruder is used for its broadest meaning to include such devices as a device that extrudes pellets as well as an extruder which produces the extrudate for forming into various articles. The physical mixing can occur in the early stages of an extruder, such as a twin screw extruder. In some embodiments, the polypropylene copolymer and the poly(sulfonyl azide) can be mixed at a regular compounding set-up such as on a twin-screw extruder, through a single extrusion process or a single reactive extrusion process. In particular, the propylene polymer and the coupling agent poly(sulfonyl azide) may be physically mixed by simultaneously introducing the propylene polymer resin and the coupling agent into the feed section of an extruder, such as through a main feed hopper or through multiple feeders. Optionally, the polysulfonyl azide may be pre-blended with a polyolefin to form a masterbatch, and the polysulfonyl azide may be introduced to the extruder by feeding the masterbatch to the feed section extruder along with the propylene polymer. Alternatively, the polysulfonyl azide may be added to the extruder downstream of feed zone, such as through a side-feeder. During extrusion, the mixture is heated to a temperature sufficient to cause the polysulfonyl azide and the polyolefin to chemically react. The temperature can be any suitable temperature, for example, in the range of from 190° C. to 280° C. The residence time at the reaction temperature can be in any suitable range such as in the range from 15 seconds to 180 seconds. The composition is cooled and pelletized. The resulting composition can be reheated and melted for processing to form useful articles. The pelletized composition can be stored and transported to a production site for making a fabricated article.

During extrusion, sulfonyl azide reacts with molten polypropylene or polypropylene copolymer in an extruder or other vessel that enables heating the polymer above its melting temperature. A PP copolymer having a branching structure is obtained.

In some other embodiments, the composition is made by branching or crosslinking the random copolymer of propylene using a peroxide, an acrylate, a siloxane, a second polymer having vinyl functional groups, or e-beam. Random copolymer of propylene and another comonomer as described are branched together with itself or another polymer through one of these methods.

Such a branching structure helps the resulting composition provide a high melt strength in the molten state, which allows the composition to be processed in equipment that requires heated polymer to maintain its integrity while stretching.

The propylene-containing composition provided in the present disclosure has a haze value less than 30%. The haze value is measured using at an injection molded plaque having a thickness of 0.508 millimeter (20 mil) following ASTM D1003.

The composition may have a suitable branching index, and also have other suitable properties such as crystallization rate, and strain hardening index.

The composition is suitable for making bottles, containers, and other useful objects by Injection Stretch Blow Molding (ISBM). It provides a broader processing window than conventional PP random copolymers, and it results in bottles with more homogeneous material distribution throughout the parts. The invention provides ISBM bottles with significantly lower haze than other branched PP. For example, an ISBM bottle produced with the inventive composition demonstrated haze <25 on a wall 11 mm inches thick.

In another respect, the present disclosure provides a fabricated article and a method for making the fabricated article, which comprises the composition described above. Examples of a resulting article include, but are not limited to, bottles, containers, vials, and any other suitable article or combination thereof.

The present disclosure also provides a fabricated article comprising the composition as described above. The article such as a bottle may be made by/through an injection stretch blow molding (ISBM) process using the composition. The descriptions above regarding the composition also apply to the article. For example, in some embodiments, the random copolymer is derived from propylene and ethylene, and ethylene has a molar content in a range of from about 1% to about 10%. In some embodiments, the article is a bottle having a clear wall having a haze value less than 30%.

In another aspect, the present disclosure also provides a method of preparing the composition. Such a method comprises a step of branching or crosslinking the random copolymer of propylene to form the PP copolymer having a branched structure. In some embodiments, the step of branching or crosslinking comprises a step of mixing the random copolymer of propylene and at least one comonomer with a poly(sulfonyl azide) at an elevated temperature. Such a mixing may be performed through extrusion in a single-screw or twin-screw extruder. In some other embodiments, the step of branching or crosslinking the random copolymer of propylene is performed using a peroxide, an acrylate, a siloxane, a second polymer having vinyl functional groups, or e-beam.

In another aspect, the present disclosure also provides a method of using the composition, comprising a step of injection stretch blow molding (ISBM) the composition so as to fabricate an article. The descriptions above regarding the composition also apply to the article. For example, in some embodiments, the composition has a crystallization temperature in a range of from 100° C. to 130° C., a melting temperature in a range of from about 140° C. to 180° C., and a melt flow index in a range of from 5 to 25 g/10 minutes. In some embodiments, the method of using the composition comprises a step of molding the composition into a preform of the article before the step of injection stretch blow molding.

The composition and the fabricated article provided in this invention exhibit unexpected properties including, but not limited to, a good combination of a balance of good mechanical properties, high chemical resistance, high optical clarity, and high temperature resistance. For the first time, the present disclosure provides a polypropylene composition performing very well in an injection stretch blow molding (ISBM) process, while providing excellent optical clarity of a resulting molded article.

The method of making the composition and the article described above also has advantages including but not limited to low manufacturing cost and high efficiency.

A fabricated article comprising the composition can be made following the step. The composition and the fabricated article provided in this invention exhibit unexpected properties including but not limited to high uniformity of low-density closed cells, high rigidity, and high temperature resistance.

The composition provided in this disclosure can optionally comprise a filler, an additive (e.g., a nucleating agent such as sorbitols), or any other suitable ingredient, or combinations thereof. The composition may contain stabilizing additives, antioxidants, UV stabilizers, acid scavengers, and/or heat or IR radiation absorbing additives. Suitable antioxidants include hindered phenols such as 2,6-di-t-butyl-4-methylphenol; 1,3,5-trimethyl-2,4,6-tris (3',5'-di-t-butyl-4'-hydroxybenzyl)-benzene; tetrakis [(methylene (3,5-di-t-butyl-4-hydroxyhydrocinnamate)] methane (IRGANOX™ 1010); octadecyl-3,5-di-t-butyl-4-hydroxy cinnamate (IRGANOX™ 1076), or organophosphates.

An additional stabilizing antioxidant, IRGANOX® B225, or IRGAFOS® 168 and calcium stearate were optionally added. IRGANOX® B225 is an antioxidant, commercially available from BASF Corporation. IRGANOX® B225 is a blend of 50% tris(2,4-ditert-butylphenyl)phosphite and 50% pentaerythritol tetrakis[3-[3,5-di-tert-butyl-4-hydroxyphenyl]propionate]. It is basically a blend of 50% IRGAFOSX® 168 (Tris(2,4-di-tert-butylphenyl)phosphite) and 50% IRGANOX® 1010.

The composition may also include pigments, dyes, or colorants. It may include additives that increase the rate of heat transfer, such as TiN, $SbO_2$, carbon black, or silica. It may include additives that enhance oxygen or water barrier performance. In some embodiments, the additives may include clays, nanoparticles, graphene, or any combination thereof. The article may be a multilayer structure, in which the PP composition is used in one or more layers. One embodiment would be a PP-EVOH-PP multi-layer structure. "EVOH" represents ethylene-vinyl alcohol copolymer. In some embodiments, a sandwich structure including PP, EVOH, and PP is used. "PP" used in the sandwich structure is the composition comprising PP copolymer and having branched structure as described herein.

In some embodiments, the composition provided in the present disclosure has a melt strength greater than 8 cN, for example, greater than 10 cN. The maximum melt strength may be up to a suitable value. For example, the maximum melt strength may be up to 100 or 200 cN in some embodiments. As a comparison, an uncoupled sample as a control having equivalent melt flow may be less than 2 cN.

EXPERIMENTAL

Twin-Screw Extrusion

The composition examples below are made by combining polypropylene random copolymer pellets or powder with DPOBSA (3000 ppm molecular melt). The mixtures of PP and poly(sulfonyl azide) were processed using twin-screw extrusion.

Testing

Melt strength measurements were conducted using a Göttfert Rheo-Tester 2000 capillary rheometer equipped with a Rheotens 71.97 set-up. A 12 mm capillary barrel was used at a barrel temperature of 190° C. The molten polymer is soaked at the test temperature for 5 minutes prior to the test. A polymer strand was pushed through a 20 mm/2 mm L/D capillary die with a 180° entrance angle at an apparent wall shear rate of ~86 $s^{-1}$. The polymer strand is then fed into the Rheotens unit and is grabbed by two sets of two wheels. The wheel speed is adjusted to reduce the acting force on the polymer strand to approximately zero. Once steady-state is achieved, the speed of the counter-rotating wheels is continuously increased, which deforms the polymer strand until fracture and/or slippage. The polymer strand resistance force to deformation is measured by the Rheotens unit. The peak force recorded during the drawing process is referred to as "melt strength."

As used herein, "melt strength", "drawability", and "extensilibilty" may be used interchangeably to describe characteristics and die swell properties of polyolefins (e.g., polypropylene) as measured on a Gottfert Rheotester 2000 unit. The Rheoten 71.87 elongational tester is used to characterize the extensional flow of the polymer melt. The melt strength (MS) is defined as the maximum force at which a molten thread or strand of the polymer as it exists through a heated barrel capillary die and drawn through a pair of Rheoten wheels of a certain diameter and gap distance under selected shear conditions before it breaks. The melting strength method means stretching uniaxially at various speeds and with constant acceleration until breakage of the molten polymer filament as produced. The analysis allows to obtain the resistance to stretching of the polymer melt and its extensibility in a given test condition. Melt strength can also be described as the resistance of a polyolefin melt to stretching. The machine measures the force required to break the polymer melt. This analysis is known as the melt strength at peak force.

The melting and crystallization temperatures of the modified polypropylenes were measured by differential scanning calorimetry (DSC). The percent crystallinity of the modified polypropylenes was measured as the ratio of the area under the curve of the heat of melting peak divided by a theoretical maximum Delta-Hm for PP, taken to by 100 J/g.

Differential Scanning calorimetry (DSC) is a technique that measures heat flows associated with transitions in materials as a function of time and temperature in a controlled atmosphere. Non-isothermal DSC sweeps were performed using a TA Instruments 200 instrument. The specimen was equilibrated at 200° C. for 5 minutes. The melt was then cooled to −50° C. at a rate of 10° C./min; the peak temperature of the melt-crystallization exotherm peak was recorded as the crystallization temperature or Tc. The specimen was then heated back to 200° C. at a rate of 10° C./min and the peak of the melting endotherm was recorded as the melting point or Tm.

As used herein, the "melt flow rate" (MFR) or "melt index" (units of g/10 min or dg/min) is described according to and measured per ASTM D1238 using a load of 2.16 kg at 230° C.

EXAMPLES

The polypropylene composition samples were produced by twin screw extrusion of the following ingredients: polypropylene random copolymer of propylene and ethylene; and a molecular melt comprising DPOBSA.

The molecular melt used contained 25 wt. % of 4,4'-diphenyl oxide bis(sulfonyl azide) (DPOBSA) phlegmatized in 75 wt. % of antioxidant, IRGANOX® 1010, which is Tetrakis [methylene (3,5-di-tert-butyl-4-hydroxyhydrocinnamate)] methane.

RP1 is a random copolymer of propylene and 2.5 wt. % of ethylene has a MFR of 12 dg/minute.

Branched HPP is a branched homopolymer of propylene having a MRI of 2 dg/minute, which was obtained by mixing a PP homopolymer and 5,500 ppm of the molecular melt comprising 4,4'-diphenyl oxide bis(sulfonyl azide) (DPOBSA) as described herein.

RP2 is a random copolymer of propylene and 2.5 wt. % of ethylene having a MM of 31 dg/minute.

"ICP1" is an impact copolymer of propylene and 12.25 wt. % of ethylene having a MRI of 14 dg/minute.

"ICP2" is an impact copolymer of propylene and 5 wt. % of ethylene having a MRI of 14 dg/minute. The formulations and properties of Example 1 and Comparative Examples are shown in Tables 1-2.

TABLE 1

Composition Example and Comparative Examples

| Examples | CEx. 1 | Ex. 1 | CEx. 2 | CEx. 3 | CEx. 4 | CEx. 5 |
|---|---|---|---|---|---|---|
| Materials | RP1 | RCP HMS | 80% RP1/20% Branched HPP | ICP1 | ICP2 | 90% RP1/10% Branched HPP |
| PP Polymer | Random copolymer | Random copolymer | Random copolymer (80%)/ branched homopolymer (20%) | Impact copolymer | Clear Impact copolymer | Random copolymer (90%)/ branched homopolymer (10%) |
| Melt Flow Index (g/10 minutes) | 12 | 13 | 11.5 | 15.4 | 17 | 11.7 |
| Ethylene content (wt. %) in PP | 2.5 | 2.5 | 2 | 12.25 | 5 | 2.25 |
| Molecular melt (DPOBSA phlegmatized in IRGANOX ® 1010, ppm) | 0 | 3,000 | Included in Branched HPP | 0 | 0 | Included in Branched HPP |
| Branched or not branched | Not branched | Branched | Including Branched homopolymer | Not branched | Not branched | Including Branched homopolymer |

TABLE 2

Properties of Sample and Comparative Examples

| Examples | CEx. 1 | Ex. 1 | CEx. 2 | CEx. 6 | CEx. 3 | CEx. 4 |
|---|---|---|---|---|---|---|
| Materials | RP1 | RCP HMS | 80% RP1/20% Branched HPP | 80% RP2/20% Branched HPP | ICP1 | ICP2 |
| PP Polymer | Random copolymer | Branched random copolymer | Random copolymer (80%)/ branched homopolymer (20%) | Random copolymer (80%)/ branched homopolymer (20%) | Impact copolymer | Impact copolymer |
| MFR (g/10 minutes) | 12 | 13 | 11.5 | 24.5 | 15.4 | 17 |
| Ethylene content (wt. %) | 2.5 | 2.5 | 2 | 2.4 | 12.25 | 5 |
| Molecular melt (ppm) | 0 | 3,000 | Included in Branched HPP | Included in Branched HPP | 0 | 0 |
| Branched or not branched | Not branched | Branched | Including Branched homopolymer | Including Branched homopolymer | Not branched | Not branched |
| Tc 1 (° C.) | 121.23 | 121.92 | 126.19 | 126.8 | 130.09 | 133.87 |
| Tc 2 (° C.) | | | | | 149.79 | |
| Tm 1 (° C.) | 149.54 | 152.95 | 156.18 | 156.51 | 159.51 | 165.14 |
| Tm 2 (° C.) | 138.54 | | | | 122.38 | |

FIG. 1 shows a relationship between the extended viscosity (Pa·s, in y-axis) and the strain (in x-axis) for some experimental samples and comparative samples. Extensional viscosity was tested on an Anton Parr MCR 502 using a sentmanat extensional rheometer (SER) 3 fixture. Samples were molded into 1 mm thick plaques then cut into 12 mm×12 mm×1 mm strips. Strips were then tested on the SER 3 at 190° C. and a constant strain rate of 1/s. Samples were run in duplicate. This test is an additional way of measuring melt strength and the extensional properties of the samples. The results show the strain hardening of Ex. 1 (increasing extensional viscosity with strain) along with the improved haze, which provides Ex. 1 the unique final ISBM part properties.

Figure 2:
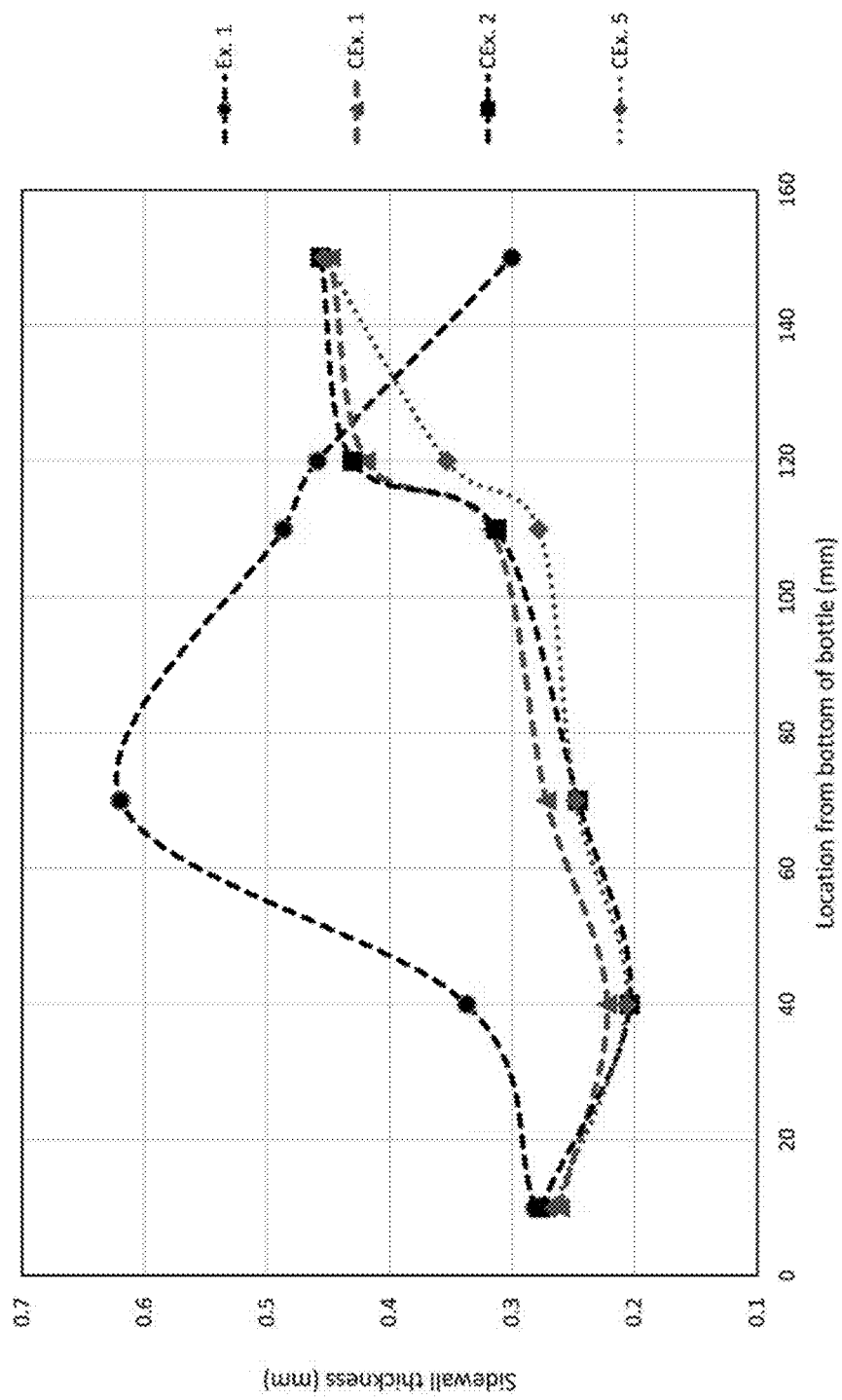
FIG. 2 shows sidewall thickness (mm) versus the height (mm) from the base for some experimental samples and comparative samples.

FIG. 2 shows sidewall thickness (mm) versus the height from the base for some experimental samples and comparative samples.

Bottles as exemplary fabricated articles were made a pre-form with an ISBM process. A bottle is created through a two-stage blow molding process. The injection molding was first performed on Arburg 320M, a hot runner system. The second-stage molding was performed on Sidel 1025. A mold for a 500 ml 11.5 g water bottle was used. The oven was heated using 6 zones, split into 2 boxes. The molding capacity was 900 bottles per hour. Pre-form temperature was measured by removing the heated preform from the oven and using a hand-held IR wand that fit into the heated preform. Two preforms were used as bookends to simulate the radiant heating from preforms that occurs when the machine is operating continuously. Side wall distribution was tested by cutting the bottle into four sections by hot wire and weighing them. The power output of the IR heaters was adjusted to achieve as even weight distribution throughout the bottle as possible for each resin. Even weight distribution throughout a bottle the strength (top load) and hand feel of the bottle. The molding temperature is in a range of from 110° C. to 130° C.

TABLE 3

Heat profiles and bottle weight distributions of bottles made using experimental samples and comparative PP compositions

| | CEx. 1 | Ex. 1 | CEx. 2 | CEx. 3 | CEx. 4 | CEx. 5 |
|---|---|---|---|---|---|---|
| Materials | RP1 | RCP HMS | 80% RP1/20% Branched HPP | ICP1 | ICP2 | 90% RP1/ 10% HMS |
| Speed, bph | 900 | 900 | 900 | 900 | 900 | 900 |
| Overall | 80 | 75 | 75 | 80 | 83 | 83 |
| Lamp 6 | 50 | 55 | 65 | 70 | 70 | 68 |
| Lamp 5 | 70 | 70 | 80 | 80 | 70 | 70 |
| Lamp 4 | 85 | 100 | 70 | 70 | 90 | 90 |
| Lamp 3 | 25 | 65 | 45 | 30 | 45 | 60 |
| Lamp 2 | 10 | off | 15 | 10 | Off | Off |
| Lamp 1 | 100 | 65 | 100 | 100 | 100 | 95 |
| Preform Temperature (° C.) | 117 | 114 | 124 | 127 | 130 | 124 |

TABLE 3-continued

Heat profiles and bottle weight distributions of bottles made using experimental samples and comparative PP compositions

|  | CEx. 1 | Ex. 1 | CEx. 2 | CEx. 3 | CEx. 4 | CEx. 5 |
|---|---|---|---|---|---|---|
| Bottle weight (g) | 5.7 | 5.2 | 5.7 | 5.7 | 5.7 | 6.0 |
| Bottle weight (g) | 2.5 | 4.4 | 2.3 | 2.2 | 2.2 | 2.3 |
| Bottle weight (g) | 5.0 | 5.1 | 4.6 | 5.5 | 5.0 | 4.2 |
| Bottle weight (g) | 4.4 | 2.9 | 4.9 | 4.5 | 4.9 | 4.9 |

Table 3 shows heat profiles and bottle weight distributions of the samples obtained. The data values for "overall" and each of lamps 1-6 are the percentage of total power output for the corresponding lamps. The data values are multiplied together. For example, if the overall output is 80% and a zone is set to 50%, this individual zone is outputting 40% of its maximum output. If that same zone was 100%, it would be outputting 80% of its maximum output. The temperature profile used was optimized for each resin to try and obtain an even material distribution throughout the bottle. At the end of the experiment, RP1 and 90% RP1 10% Branched HPP were molded at the same conditions as RCP HMS. The results show that the improvement in properties was caused by the resin and not the processing conditions. Processing window is also significant. On a production line, power output on a blow molding machine may vary sometimes. If a resin can only be formed in a very narrow range of power outputs, it will be difficult to run.

TABLE 4

Properties of Bottles Made From Samples and Comparative Samples

| Sample | Top Load (lbf) | Stdev (lbf) | Top Haze % (top) | Side Haze % (side) |
|---|---|---|---|---|
| RP1 | 13.6 | 0.6 | 10.9 | 3.9 |
| HMS RCP | 18.9 | 2.7 | 22 | 15.4 |
| 80% RP1/20% Branched HPP | 12 | 0.4 | 31.2 | 21.4 |
| ICP1 | 8.4 | 0.5 | 25.9 | 5.4 |
| ICP2 | 8.9 | 0.3 | 26.6 | 5.6 |
| 90% RP1/10% Branched HPP | 9.2 | 0.2 | 32.4 | 12.5 |

Table 4 shows the properties of bottles made using samples and comparative samples. In Table 4, top load is a parameter from a yield test, and measures the force with unit of lbf at which a bottle crushes. Haze was measured from sections cut from a bottle made using an ISBM process. Haze (side) was measured from the center of the side wall. Haze (top) is measured at the top of the bottle near the cap.

Resulting bottles with high clarity were formed using RP1, a clarified random copolymer. However, the blow molding process window was narrow. The experimental sample, which is branched random copolymer having high melt strength exhibited good clarity and good material distribution, over a broader processing window.

The ICP comparative samples provided clear bottles, due to stretching imparted by the ISBM process. Bottles had excess material in neck and base, attributed to a lack of strain hardening.

Comparative examples of blends including a branched homopolymer and a random copolymer, RCP1 or RCP2, enabled production of bottles with improved material distribution and processing range. But the bottles did not exhibit good clarity due to surface roughness, especially on the bottle interior. Surface roughness caused samples to be much hazier in the blow molded parts than injection molded plaques.

The composition provided in the present disclosure, which comprises a PP copolymer having a branched structure, has excellent heat resistance as shown by melting temperature, heat deflection temperature, and article stiffness upon filling with hot liquids. In some embodiments, the composition has a melting temperature greater than 145° C. The article stiffness upon filling with hot liquid, such as hot fill processes to fill containers or microwave heating of food in filled containers, can maintain at a temperature of 100° C. or above.

Additives can be also added into the composition to increase the rate of heat transfer in some embodiments. The additives for heat transfer may increase the rate of heat uptake at the surface or conduct heat into a core of an article. Examples of suitable additives include, but are not limited to, clay, nano-fillers, graphene, and any combination thereof. In some embodiments, additives used are available from PolyOne under Trademark of ColorMatrix™ Joule™.

Although the subject matter has been described in terms of exemplary embodiments, it is not limited thereto. Rather, the appended claims should be construed broadly, to include other variants and embodiments, which may be made by those skilled in the art.

What is claimed is:

1. A composition comprising a polypropylene (PP) copolymer having a branched structure as the only polypropylene in the composition, the PP copolymer being a random copolymer derived from propylene and at least one comonomer selected from the group consisting of ethylene, any $C_4$-$C_8$ alpha-olefin, and combinations thereof,
   wherein the composition has a melt flow index in a range of from 10 g/10 minutes to 30 g/10 minutes according to and measured per ASTM D1238 using a load of 2.16 kg at 230° C.,
   wherein the composition is suitable for an injection stretch blow molding (ISBM) process, and
   wherein the composition is made by mixing the random copolymer derived from propylene and the at least one comonomer with a poly(sulfonyl azide) at an elevated temperature, or by branching or crosslinking the random copolymer derived from propylene and the at least one comonomer using a peroxide, an acrylate, a siloxane, a second polymer having vinyl functional groups, or e-beam.

2. The composition of claim 1, wherein the at least one comonomer or moiety thereof has a molar content in a range from about 1% to about 10% by a total amount of propylene and the at least one comonomer.

3. The composition of claim 1, wherein the composition has a melt flow index in a range of from 10 g/10 minutes to 25 g/10 minutes.

4. The composition of claim 1, wherein the at least one comonomer comprises ethylene.

5. The composition of claim 1, wherein the composition has a crystallization temperature of less than 130° C., and a melting temperature in a range of from about 140° C. to 180° C.

6. The composition of claim 1, wherein the composition is made by mixing the random copolymer derived from propylene and the at least one comonomer with a poly(sulfonyl azide) at an elevated temperature.

7. The composition of claim 6, wherein the poly(sulfonyl azide) has a content in the range from 500 ppm to 5,000 ppm, based on the total weight of the random copolymer derived from propylene and the at least one comonomer, and the poly(sulfonyl azide).

8. The composition of claim 1, wherein the composition has a haze value less than 30%, the haze value being measured using an injection molded plaque having a thickness of 0.508 millimeter (20 mil) following ASTM D1003.

9. The composition of claim 1, wherein the composition has a melt flow index in a range of from 13 g/10 minutes to 30 g/10 minutes according to and measured per ASTM D1238 using a load of 2.16 kg at 230° C.

10. An article, comprising the composition of claim 1.

11. The article of claim 10, wherein the at least one monomer is ethylene, ethylene having a molar content in a range of from about 1% to about 10%.

12. The article of claim 10, wherein the article is made by injection stretch blow molding (ISBM) the composition.

13. The article of claim 10, wherein the article is a bottle having a clear wall having a haze value less than 30%.

14. A method of preparing the composition of claim 1, comprising a step of branching or crosslinking the random copolymer derived from propylene and the at least one comonomer to form the PP copolymer having a branched structure.

15. The method of claim 14, wherein the step of branching or crosslinking comprises mixing the random copolymer of propylene and at least one comonomer with a poly(sulfonyl azide) at an elevated temperature.

16. The method of claim 14, wherein the step of branching or crosslinking the random copolymer of propylene is performed using a peroxide, an acrylate, a siloxane, a second polymer having vinyl functional groups, or e-beam.

17. A method of using the composition of claim 1, comprising a step of injection stretch blow molding (ISBM) the composition so as to fabricate an article.

18. The method of claim 17, wherein the composition has a crystallization temperature in a range of from 100° C. to 130° C., a melting temperature in a range of from about 140° C. to 180° C., and a melt flow index in a range of from 5 to 25 g/10 minutes.

19. The method of claim 17, further comprising a step of molding the composition into a preform of the article before the step of injection stretch blow molding.

* * * * *